United States Patent Office 3,634,442
Patented Jan. 11, 1972

3,634,442
METAL CONTAINING DISUBSTITUTED PERTHIOCYANATES
Raymond Seltzer, New York, N.Y., assignor to M & T Chemicals Inc., New York, N.Y.
No Drawing. Filed Oct. 2, 1968, Ser. No. 764,625
Int. Cl. C07d 91/60
U.S. Cl. 260—299      6 Claims

ABSTRACT OF THE DISCLOSURE

This invention relates to novel compounds and to a process for preparing compounds of the formula:

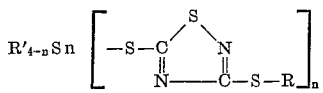

in which R and R' are each selected from the group consisting of alkyl, aryl, cycloalkyl, aralkyl, alkenyl in which the double bond is not in juxtaposition with the alpha carbon atoms, and $n$ is an integer 1–3.

---

This invention relates to thiadiazoles and more particularly, to unsymmetrical disubstituted 3,5-dimercapto-1,2,4-thiadiazoles and their preparation.

Symmetrical dialkyl and diaralkyl 3,5-dimercapto-1,2,4-thiadiazoles have been reported in the literature. Because of the difference between the sulfur atoms attached to the 3 and 5 carbon atoms of the 1,2,4-thiadiazole ring

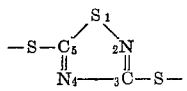

the conventional synthesis routes have not been satisfactory for the preparation of unsymmetrical disubstituted perthiocyanates and these compounds have thus heretofore been unknown.

It is an object of this invention to provide a new class of unsymmetrical derivatives of 3,5-dimercapto-1,2,4-thiadiazole. It is a further object to provide a novel synthesis technique for the preparation of these new compounds. Other objects of this invention will be obvious to those skilled in the art on inspection of the following description.

This invention relates to novel compositions and to a process for preparing a novel compound comprising recurring units of the formula:

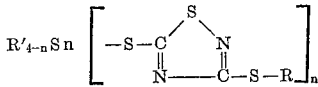

in which R and R' are each selected from the group consisting of alkyl, aryl, cycloalkyl, aralkyl, alkenyl in which the double bond is not attached on the alpha carbon atoms, and $n$ is an integer 1–3.

The novel process of this invention comprises reacting a compound of the formula:

$$[R'_{4-n}Sn]_m Y_n$$

in which R' is selected from the group consisting of alkyl, aryl, cycloalkyl, aralkyl, alkenyl in which the double bond is not attached on the alpha carbon atoms, and in which Y is selected from the group consisting of oxygen, hydroxyl, chlorine, bromine, and iodine, $n$ and $m$ are integers of 1–3 with a compound of the structure:

in which R is selected from the group consisting of alkyl, aryl, cycloalkyl, aralkyl, alkaryl, alkenyl in which the double bond is not attached on the alpha carbon atoms and $n$ is an integer 1–3, and in which Z is selected from the group consisting of alkali metals and hydrogen and recovering:

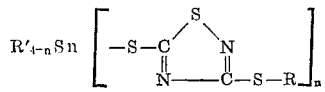

wherein R and R' are defined as above.

According to another of its aspects, the novel process of this invention comprises reacting a compound of the formula:

$$R'_{4-n}SnX_n$$

in which X is a halogen, and R' and $n$ have the same meanings as stated above with a heterocyclic part of the formula:

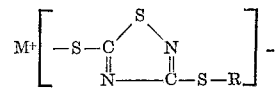

in which M is a metal ion. The product is then recovered from the reaction medium.

The process of this invention just described is represented by the partial equations:

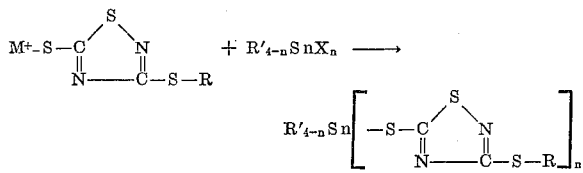

The suitable compounds $R'_{4-n}SnX_n$ for the reaction may be selected from a wide range of chemicals containing the replaceable group X. In this compound, X may be selected from the group consisting of halogens, hydroxide, and oxygen, and R may be a hydrocarbon radical preferably selected from the group consisting of alkyl, aryl, cycloalkyl, aralkyl, alkenyl in which the double bond is not attached to the alpha carbon atom, and including such radicals when inertly substituted. When R is alkyl, it may typically be straight chain alkyl or branched alkyl, including methyl, ethyl, n-propyl, isopropyl, n-butyl, isobutyl, sec-butyl, tert-butyl, n-amyl, neopentyl, isoamyl, n-hexyl, isohexyl, heptyls, octyls, decyls, dodecyls, tetradecyl, octadecyl, etc. Preferred alkyl includes lower alkyl, i.e. having less than about 8 carbon atoms, e.g. octyls and lower. When R is alkenyl, it may typically be allyl, 1-propenyl, methallyl, buten-1-yl, buten-2-yl, buten-3-yl, penten-1-yl, hexenyl, heptenyl, octenyl, decenyl, dodecenyl, tetradecenyl, octadecenyl, etc. When R is cycloalkyl, it may typically be cyclopentyl, cyclohexyl, cycloheptyl, cyclooctyl, etc. When R is aralkyl, it may typically be benzyl, β-phenylethyl, γ-phenylpropyl, β-phenylpropyl, etc. R may be inertly substituted, i.e. R may bear a non-reactive substituent such as alkyl, aryl, cycloalkyl, aralkyl, alkaryl, alkenyl, ether, nitro, etc. Typical substituted alkyls, cycloalkyls, and aralkyls include 2-ethoxyethyl, carboethoxymethyl, p-phenylbenzyl, p-methylbenzyl, etc.

The compound $R'_{4-n}SnX_n$ preferably is an alkylating agent in which X is a chlorine, bromine or iodine attached to the tin atom of the compound and $n$ in this type of compound is one.

The heterocyclic salt suitable for the reaction may be prepared by any known method. Advantageously it may be prepared by reacting an alkali metal salt of perthiocyanic acid with a compound of the formula:

RX in which R has the same significance as the R' depicted hereinabove, X also has the same meaning as above stated. This process may be represented by the partial equations:

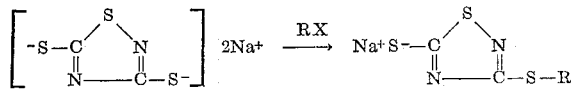

In place of alkali metal, copper, aluminum, iron or magnesium may be placed in the heterocyclic compounds and may be suitable for the process of this invention.

The process involving the reaction of the heterocyclic salt with the compound $R'_{4-n}SnX_n$ is preferably conducted in an aqueous organic solvent capable of at least partially dissolving the reactants. The nature of the solvent is not critical, and thus any suitable inert organic solvent may also be used. Typical solvents that are employed include alkanols such as methanol and ethanol; ketones such as acetone or methyl ethyl ketone; and ethers such as dioxane and tetrahydrofuran. The amount of reaction medium is immaterial as long as sufficient amount is used to maintain the reaction in a liquid medium.

Conveniently, the reaction may be carried out in the ambient temperature although the reaction may proceed within a wide temperature limit. Generally, there is no advantage to carrying out the reaction in a temperature much below 0° C. or exceeding 200° C. A suitable temperature range is 15°–50° C.

The relative proportions of the two reactants, the alkali metal salt of mono-substituted perthiocyanate and compounds $R'_{4-n}SnX_n$ are about the stoichiometric ratio however, it does not appear to have any sharp critical limit.

Recovery of the composition from the reaction mixture is governed by the physical properties of the specific product and by the solvents used. The solvent selected is preferably one in which the product is soluble at elevated temperatures and insoluble at lower temperatures, thus facilitating recovery by filtration.

By the selection of proper compounds of the formula:

$$R'_{4-n}SnX_n$$

a new class of unsymmetrical disubstituted metallic perthiocyanates is obtained. The disubstituted perthiocyanates with two dissimilar substituents are used as biocides. They control a wide variety of pestiferous organisms, particularly bacteria, fungi, and marine organisms.

Further to illustrate the invention specific examples are described hereinbelow:

EXAMPLE 1

Dibutyltin bis(3 - methylmercapto-1,2,4-thiadiazole-5-mercaptide)

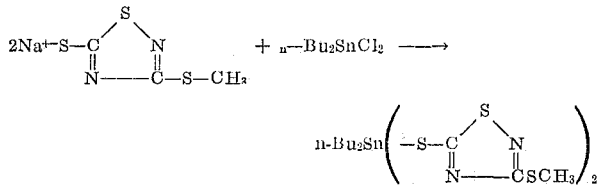

A solution of 0.067 mole of the sodium salt of 3-methylmercapto-5-mercapto-1,2,4-thiadiazole was formed in 100 milliliters of tetrahydrofuran. To the foregoing solution was added a solution of 10.2 grams (0.034 mole) of di-n-butyltin dichloride in 50 milliliters of tetrahydrofuran in drop-sized increments. The reaction mixture exhibited a temperature in the range of 20° C. to 30° C. during the reaction. After the addition was complete, the reaction mixture was stirred overnight at room temperature, and then filtered. The filtrate was poured into cold water, the resulting solid was filtered, washed with water, and dried in a vacuum oven at 70° C., to yield 16.0 grams of product, a yield of 94%, exhibiting a melting point of 85° C.–95° C. Recrystallization from methanol yielded 11.1 grams of analytically pure dibutyltin bis(3-methylmercapto - 1,2,4 - thiadiazole-5-mercaptide) exhibiting a melting point of 100° C.–101° C.

Elemental analysis. — Calculated for $C_{14}H_{24}N_4S_6Sn$ (percent): N, 1.00; S, 34.4; Sn, 21.2. Found (percent): N, 10.0; S, 33.7; Sn, 21.4.

EXAMPLE 2

3-methylmercapto-5-tricyclohexyltin mercapto-1,2,4-thiadiazole

A solution of 32.8 grams (0.20 mole) of 3-methylmercapto-5-mercapto-1,2,4-thiadiazole and 77.1 grams (0.20 mole) of tricyclohexyltin hydroxide in 500 milliliters of benzene was formed. The reaction mixture was stirred and refluxed for 90 minutes. The reaction mass was cooled and thereafter filtered. The benzene solvent was stripped from the filtrate leaving 98.0 grams of 3-methylmercapto - 5 - tricyclohexyltinmercapto-1,2,4-thiadiazole (92% of theory).

Elemental analysis. — Calculated for $C_{21}H_{36}N_2S_3Sn$ (percent): Sn, 22.34; S, 18.10; N, 5.27. Found (percent): Sn, 22.66; S, 17.96; N, 5.30.

EXAMPLE 3

3-methylmercapto-5-tributyltinmercapto-1,2,4-thiadiazole reaction

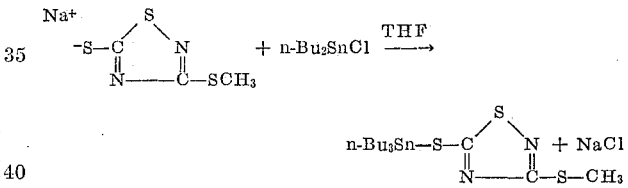

To a solution of 4.0 grams (0.1 mole) of sodium hydroxide in 20 milliliters of water and 75 milliliters of methanol was added 16.4 grams (0.1 mole) of 3-methylmercapto-5-mercapto-1,2,4-thiadiazole. The mixture was stirred until solution resulted and then filtered. The filtrate was stripped to dryness, the residue was dissolved in 100 milliliters of tetrahydrofuran. While stirring the tetrahydrofuran solution at room temperature, a solution of 32.5 grams (0.1 mole) of chloride in 50 milliliters of tetrahydrofuran was added dropwise (no exotherm). Precipitation occurred during the addition. After the addition was complete, the reaction mixture was stirred at room temperature overnight (18 hours).

The reaction mixture was filtered. The residue amounted to 4.0 grams of water-soluble material (69% sodium chloride). The filtrate was stripped to dryness leaving 38.0 grams of a cloudy liquid. A small amount of solid precipitated on standing. The mixture was triturated in the cold with 95% ethanol and then filtered. Residue —0.2 gram, white solid, melting point 85–95° C. The filtrate was poured into water and extracted with hexane. The hexane extract was dried over anhydrous magnesium sulfate; stripping the hexane extract left 28.0 grams (62%) of a yellow liquid.

Vacuum distillation at less than 1 millimeter gave a 3.0 grams yield, boiling point 140–200° C., followed by 15.0 grams of a slightly yellow liquid, boiling point 202–203° C. Redistillation of the latter fraction at less than 1 millimeter gave 10.0 grams of a colorless 3-methylmercapto - 5 - tributyltinmercapto-1,2,4-thiadiazole, boiling point 190–192° C., $n_D^{26}$ 1.5651.

Elemental analysis. — Calculated for $C_{15}H_{30}H_2S_3Sn$ (percent): N, 6.2; S, 21.2; Sn, 26.1. Found (percent): N, 6.2; S, 21.2; Sn, 26.4.

EXAMPLE 4

3-methylmercapto-5-triphenyltinmercapto-1,2,4-thiadiazole

To a solution of 0.061 mole of the sodium salt in 100 milliliters of tetrahydrofuran was added a solution of 23.5 grams (0.061 mole) of triphenyltin chloride in 75 milliliters of tetrahydrofuran. As the reaction proceeded, sodium chloride precipitated. After 17 hours at room temperature, the reaction mixture was filtered. The residue amounted to 3.30 grams (93%) of sodium chloride. The filtrate was stripped to dryness; the residue was triturated with an ethanol-water solution to give 31.0 grams (99%) of 3-methylmercapto-5-triphenyltinmercapto - 1,2,4 - thiadiazole, melting point 72–76° C. Recrystallization from 95% ethanol gave an analytical sample, melting point 75–76° C.

*Elemental analysis.*—Calculated for $C_{21}H_{18}N_2S_3Sn$ (percent): N, 5.5; S, 18.7; Sn, 23.1. Found (percent): N, 5.4; S, 18.6; Sn, 23.0.

Although this invention has been illustrated by reference to specific embodiments, modifications thereof which are clearly within the scope of the invention will be apparent to those skilled in the art.

I claim:
1. An unsymmetrical heterocyclic compound of the formula:

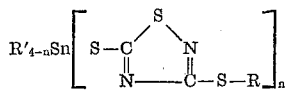

in which R is selected from the group consisting of alkyl having 1–8 carbon atoms, benzyl, and allyl and in which R′ is selected from the group consisting of alkyl having 1–8 carbon atoms; phenyl; cycloalkyl selected from the group consisting of cyclopentyl, cyclohexyl, cycloheptyl, and cyclooctyl; benzyl; vinyl; and allyl and $n$ is an integer 1–3.

2. An unsymmetrical heterocyclic compound of claim 1 which has the formula:

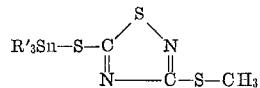

in which R′ is n-butyl.

3. An unsymmetrical heterocyclic compound of claim 1 which is 3-methylmercapto-5-tricyclohexyltinmercapto-1,2,4-thiadiazole.

4. An unsymmetrical heterocyclic compound of claim 1 which is dibutyltin bis(3-methylmercapto-1,2,4-thiadiazole-5-mercaptide).

5. An unsymmetrical heterocyclic compound of claim 1 which is 3-methylmercapto-5-tributyltinmercapto-1,2,4-thiadiazole.

6. An unsymmetrical heterocyclic compound of claim 1 which is 3-methylmercapto-5-triphenyltinmercapto-1,2,4-thiadiazole.

References Cited

Chem. Abstracts (Ihara Agricultural Chemical Co.), 39:5197 (1963).

ALEX MAZEL, Primary Examiner

R. J. GALLAGHER, Assistant Examiner

U.S. Cl. X.R.

260—302.50, 429.7, 999